United States Patent [19]

Bierens

[11] Patent Number: 5,225,028
[45] Date of Patent: Jul. 6, 1993

[54] MECHANISM FOR SUPPORTING AND RETAINING THE BEADS WHEN BUILDING PNEUMATIC TIRES

[75] Inventor: Fraciscus C. Bierens, Vaassen, Netherlands

[73] Assignee: VMI EPE Holland B.V., Epe, Netherlands

[21] Appl. No.: 732,363

[22] Filed: Jul. 18, 1991

[30] Foreign Application Priority Data

Jul. 19, 1990 [NL] Netherlands .................. 90 01645

[51] Int. Cl.⁵ .............................................. B29D 30/26
[52] U.S. Cl. ........................... 156/401; 156/398; 156/415
[58] Field of Search .............. 156/398, 414–420, 156/421.6, 131, 132, 135, 400, 401

[56] References Cited

U.S. PATENT DOCUMENTS

| | | | |
|---|---|---|---|
| 3,684,621 | 8/1972 | Frazier et al. | 156/415 X |
| 3,767,509 | 10/1973 | Gazuit | 156/415 |
| 3,833,445 | 9/1974 | Mallory et al. | 156/415 X |
| 4,149,927 | 4/1979 | Lauer, Jr. | 156/415 |

FOREIGN PATENT DOCUMENTS

| | | |
|---|---|---|
| 1288301 | 1/1969 | Fed. Rep. of Germany . |
| 1579158 | 3/1970 | Fed. Rep. of Germany . |
| 1579254 | 7/1970 | Fed. Rep. of Germany . |
| 2182894 | 5/1987 | United Kingdom . |

*Primary Examiner*—Geoffrey L. Knable
*Attorney, Agent, or Firm*—Pennie & Edmonds

[57] ABSTRACT

Mechanism for supporting and retaining the beads when building at least a portion of a pneumatic tire on a building drum, said mechanism comprising radially expandable and retractable means for laterally supporting at least a part of each bead, wherein a large number of rocker arms is arranged in a ring shape about the center line of the building drum, and means serve to shift and swivel all of these rocker arms simultaneously to an expanded position and to retract them again, said swivelling action of each rocker arm being performed in an imaginary plane extending radially through the center line of the drum and said shifting action including a component directed along the center line of the building drum.

8 Claims, 4 Drawing Sheets

5,225,028

MECHANISM FOR SUPPORTING AND RETAINING THE BEADS WHEN BUILDING PNEUMATIC TIRES

FIELD OF THE INVENTION

The invention relates to a mechanism for supporting and retaining the beads when building at least a portion of a pneumatic tire on a building drum, said mechanism comprising radially expandable and retractable means for laterally supporting, i.e. in the direction parallel to the centre line of the building drum, at least a part of each bead.

BACKGROUND OF THE INVENTION

It is desirable that the beads can each easily be brought to the correct position with respect to the building drum and that not only they are correctly retained in that position, but that also the apex and flipper pertaining to the bead are laterally supported, i.e. in a direction parallel to the centre line of the building drum. Furthermore it is desirable that the finished product can easily be removed from the building drum.

A so-called "flat" building drum, meaning that it is substantially cylindrical in its passive position and that it therefore substantially lacks any radially protruding parts, is already known, both for easily achieving the correct positioning as referred to above and for easy removal, also referred to above. In order to correctly secure the beads in the manner mentioned above, this "flat" building drum comprises pressure segments that in their radially expanded condition carry and clamp the beads and which in their retracted condition provide the desired easy supply to and discharge off the building drum.

Apart from that, it is known to have means which are radially expandable from the building drum in order to provide the above-mentioned lateral support of the bead. However, particularly with radial tires for passenger cars the height of the apex and flipper pertaining to the bead may amount to at least four times the thickness of the bead wire bundle. Therefore it is necessary that the support means can be expanded to a sufficient height so as to laterally support also the apex and flipper, said means being retractable again.

SUMMARY OF THE INVENTION

The present invention therefore aims to provide a building drum with support means that can be expanded far enough to also support a high apex and flipper. The invention particularly aims to provide a mechanism for expanding these support means, which is operated fast and simple and which is reliable.

For this purpose the invented mechanism is characterized by a large number of rocker arms arranged in a ring shape about the centre line of the building drum, and means to shift and swivel all of these rocker arms simultaneously to an expanded position and to retract them again, said swivelling action of each rocker arm being performed in an imaginary plane extending radially through the centre line of the drum and said shifting action including a component directed along the centre line of the building drum.

Preferably the invented mechanism is characterized in that a "fold back" bellows is secured with its one edge in the expandable ends of all rocker arms, said bellows being known per se and being U-shaped in radial section, and serving to fold back any layers, e.g. carcass layers, protruding beyond the bead in the direction of one end of the building drum.

Thus the bead wire bundle, flipper and apex of the bead are not only supported laterally against the rocker arms via the adjacent other elements of the pneumatic tire and via the adjacent part of the bellows, but said part of the elastic and resilient bellows also abutts airproof onto said other adjacent elements of the pneumatic tire under construction. Both the radial and the lateral accuracy with which the bead can therefore be positioned, ensures optimum quality of the tire under construction and thus a good quality of the finished pneumatic tire is achieved.

The invented mechanism is also preferably applied to a so-called "flat" building drum, which is known per se and which has two mirror symmetric end parts which are shiftable towards one another, the diameter of the building drum in its flat condition being smaller than the internal diameter of a bead and the building drum regaining its original diameter when the rocker arms are again retracted. In this way the beads can be arranged about the building drum more easily, and the finished product can be removed from the building drum more easily as well.

According to the invention the means for shifting the end parts of the building drum towards and away from one another may be operable independently of the means for expanding and retracting the rocker arms. Thus the end parts of the building drum can be shifted even more towards one another after the tire has been completely built, in order to release the bellows from the tire as it is bound to stick somewhat to the tire, which is made of unvulcanized rubber.

BRIEF DESCRIPTION OF THE DRAWINGS

The invention will be further elucidated in the following description of an example of the invented bead shoulder mechanism, as represented in the accompanying drawing. In this drawing.

DESCRIPTION OF THE PREFERRED EMBODIMENT

Figure 1:
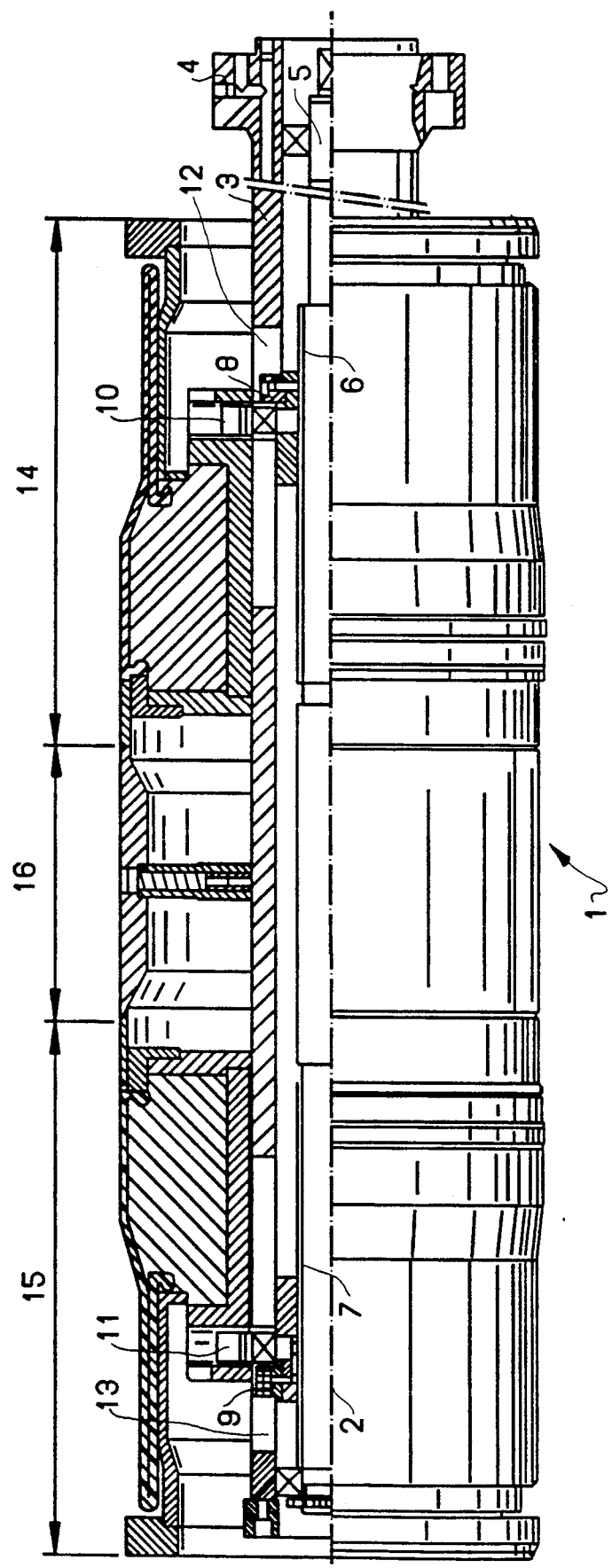
FIG. 1 is a schematical representation of a tire-building drum to which the present invention can be applied, and in which above the centre line of said drum this drum is indicated in radial section, whereas below said centre line this building drum is indicated in side view.

The tire-building drum as shown in FIG. 1 has a general centre line 2 and as the building drum is substantially cylindrical, it is referred to as a flat building drum. FIG. 1 shows above the centre line 2 a radial section of that particular portion of the building drum, whereas FIG. 1 shows below the centre line a side view of the building drum.

As shown in FIG. 1, the tire-building drum comprises a hollow shaft 3 extending over the entire length of the building drum, said shaft being coupled with drive means 4 for rotating said shaft. Within the shaft extends a steering spindle 5 with screw thread 6 and 7, each cooperating with a nut 8 or 9, respectively. On each nut a pin 10 or 11, respectively, is mounted, each pin protruding through a slot 12 or 13, respectively, in the wall of the hollow shaft 3.

As shown in FIG. 1, each pin 10, 11 is coupled to either a right-hand or left-hand drum portion 14 or 15, respectively, each being disposed shiftably on the shaft 3. By rotating the steering spindle 5 in the one direction with respect to the shaft 3, the nuts 8 and 9 are moved towards one another along the screw thread parts 6 or 7, respectively, resulting in that the drum portions 14 and 15, respectively, are shifted towards one another by the pins 10 and 11, respectively, by means of the nuts 8 and 9, respectively.

If the steering spindle is rotated in the opposite direction, the drum portions 14 and 15, respectively, will shift away from one another along the shaft 3 in the manner as described above.

The central drum portion 16 comprises elements that form a cylinder, allowing the left-hand and right-hand drum portions 15 and 14, respectively, to shift towards one another and vice versa.

Figure 2:
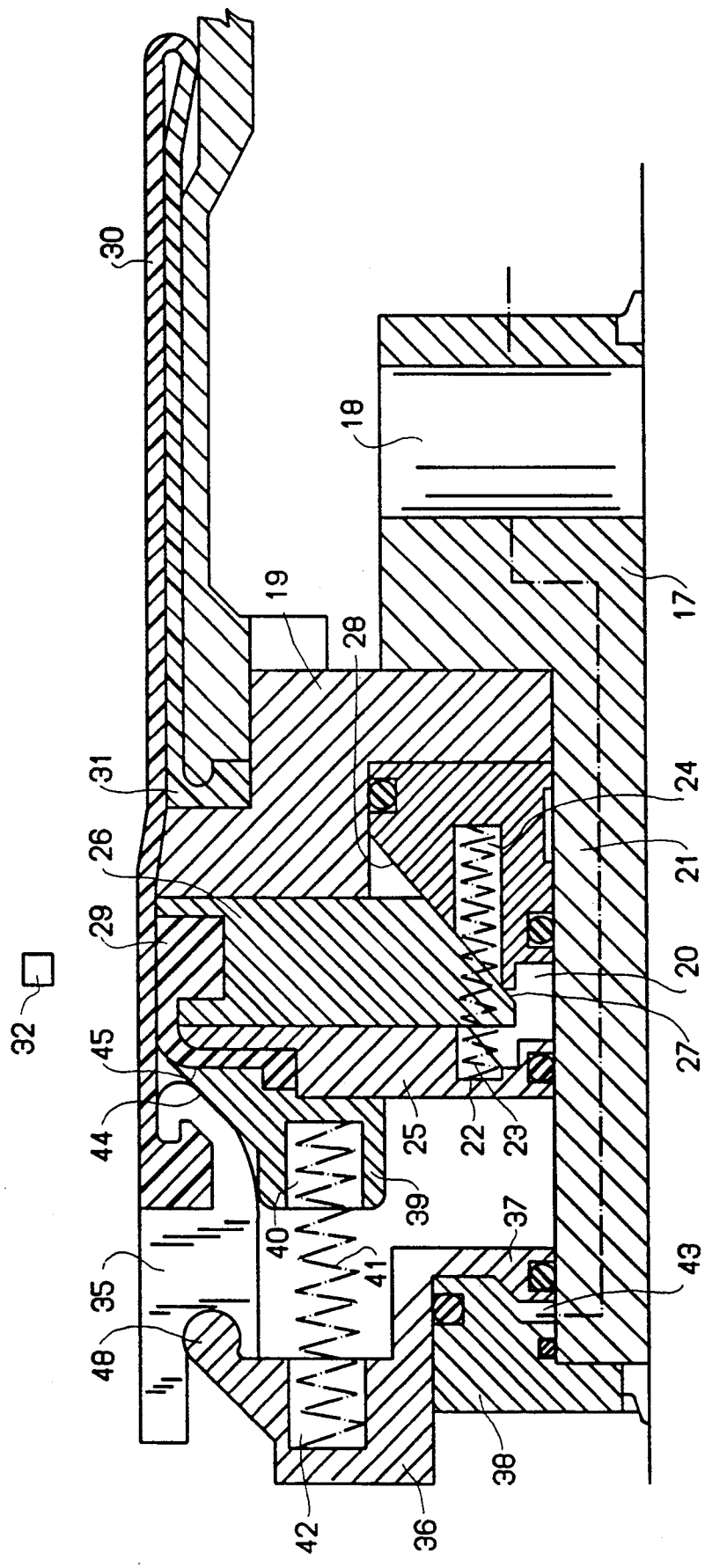
FIG. 2 shows a radial section of a part of the invented bead shoulder mechanism in the retracted position, which part is disposed above the centre line of the building drum.

The left-hand and right-hand drum portions 15 and 14 are mirror symmetric with respect to the plane perpendicular to the centre line 2 and through the central drum portion 16, so that is suffices to describe the right-hand drum 14 according to FIG. 2 at this point.

Figure 3:
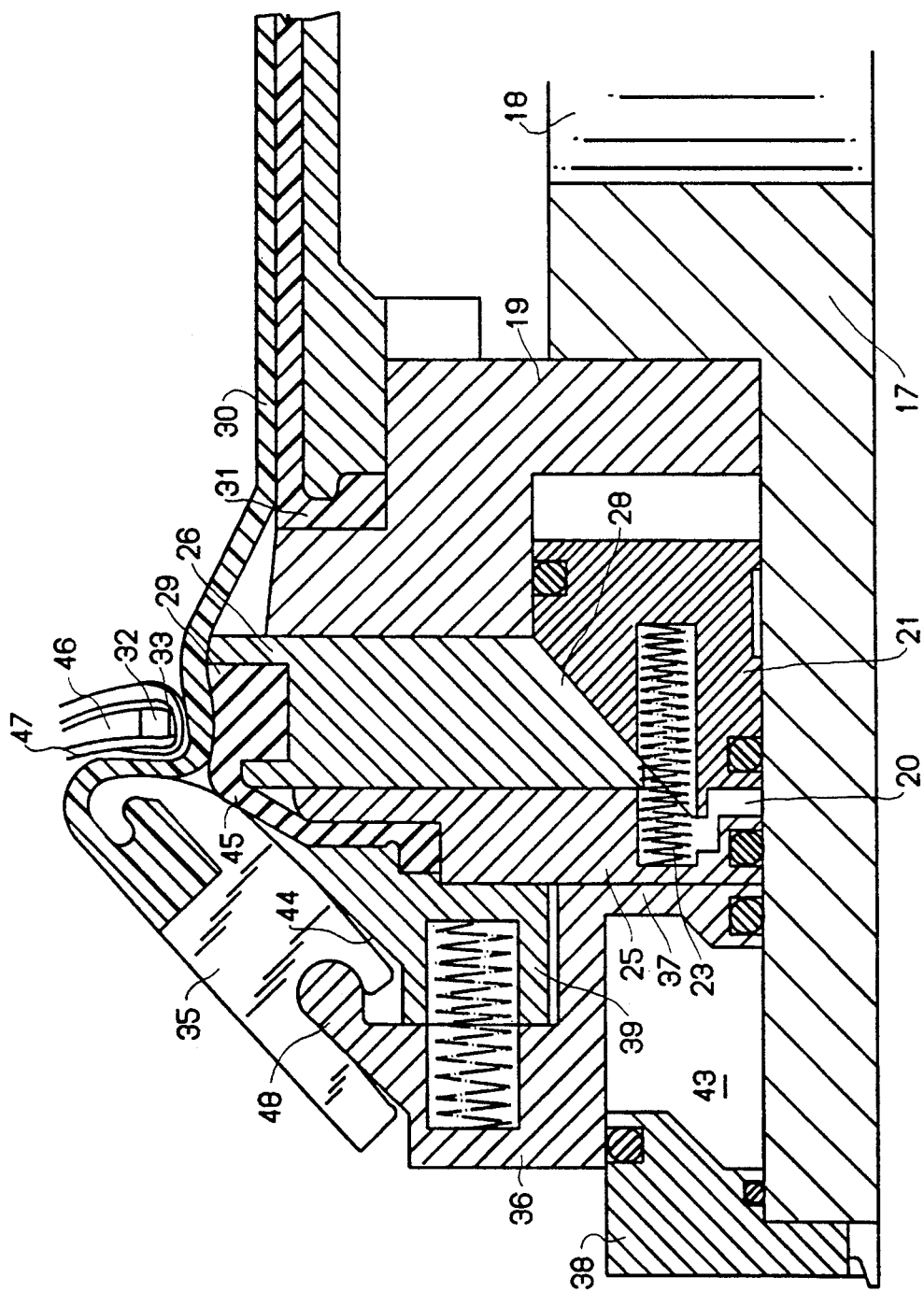
FIG. 3 shows a radial section as shown in FIG. 2, in which, however, the invented bead shoulder mechanism is in the position in which a shoulder for a bead for a pneumatic tire is formed.

A radial section of part of the right-hand drum portion 14 is represented in FIG. 2 separately and at a larger scale than in FIG. 1. It should be noted that the right-hand drum portion 14 extends substantially in a ring shape about the shaft 3 in FIG. 1, so that FIG. 2 merely represents the part above the shaft 3 of the total radial section of the right-hand drum portion 14. FIG. 3, in turn, shows a part of FIG. 2 at a larger scale. The right-hand portion 14 comprises an annular carrier 17, slidable along the shaft 3 and having a hole 18 for pin 10 as shown in FIG. 1.

As shown in FIGS. 2 and 3, around the carrier 17 an annular cylinder holder 19 is arranged, having therein an annular cylinder space 20 for an annular piston 21. A closing ring 25 comprises a number of holes 22, a spring 23 protruding with its one end into each hole 22, and each spring protruding with its other end into a hole 24 in the piston 21. As FIG. 2 only is a radial section of a part of the right-hand drum portion, only one spring 23 with pertaining holes 22 and 24 has been drawn in FIG. 2. However, a sufficient number of springs 23 is disposed about the shaft 3 to push the piston 21 back to the position as shown in FIG. 2 in a reliable manner after this piston has been shifted to the left by means of overpressure, to the position as shown in FIG. 3, and after the over-pressure has subsequently been lifted. The means for e.g. pneumatically or hydraulically shifting the piston 21 are easy to design for an expert and therefore they are not discussed here.

As shown in FIGS. 2 and 3, between the cylinder holder 19 and the closing ring 25 pressure segments 26 have been disposed, which are radially slidable back and forth with respect to the shaft 3. E.g. twenty-four of these pressure segments are present about the shaft 3. The radial inner ends of all pressure segments 26 are formed by surfaces 27, sloping with respect to the centre line of the shaft and cooperating with equally sloping surfaces 28 of the annular piston 21. On account of these sloping surfaces 27 and 28, the sliding of the piston 21 from the retracted position as shown in FIG. 2 to the extended position according to FIG. 3 is converted into a radial, outward pushing of the pressure segments 26 from the retracted position as shown in FIG. 2 to the expanded position as shown in FIG. 3.

As shown in FIGS. 2 and 3, a pressure ring 29 of resilient material, such as natural rubber, is disposed in recesses in the radial outer ends of the pressure segments 26. This pressure ring extends coaxially about the shaft 3 and has sufficient strength to push the pressure segments 26 continuously against the piston 21. The pressure ring 29 particularly pushes the pressure segments 26 radially inwards when the piston 21 is shifted from the extended position as shown in FIG. 3 to the retracted position according to FIG. 2.

As shown in FIG. 2, the one end of an inflatable bellows 30, U-shaped in radial section, extends across the pressure ring 29, said bellows being connected airproof at the cylinder holder 19 with its other end 31. This bellows is drawn in FIGS. 2 and 3 in its deflated condition and extends in a ring shape about the shaft 3 (FIG. 1).

The presently described tire-building drum is operated as indicated schematically in FIG. 4. In its passive position, i.e. at the start of the construction of a pneumatic tire or part thereof, the building drum is substantially cylindrical as shown in FIGS. 1 and 2. Subsequently a system 33 of layers is placed about the building drum 1, said system of layers being substantially cylindrical as shown in FIG. 4A. Then the two bead rings 32 are placed on the outside of the system 33 of layers that is destined to form a part of a pneumatic tire. For clarity's sake, FIG. 2 merely shows the bead ring 32 without the pertaining apex and flipper, and the system of layers has been omitted from the drawing as well. Adjacent to the bead ring this system of layers e.g. comprises one or more carcass layers, a chafer strip and a bead strip.

Subsequently the piston 21 is shifted from the passive position 2 to the left into the operating position as shown in FIG. 3 by means of over-pressure. On account of this shifting, the piston 21 via its sloping surface 28 pushes the pressure segments 26 outwards via their sloping surfaces, thus moving the pressure segments from their retracted positions as shown in FIG. 2 to their expanded positions as shown in FIGS. 3 and 4B.

As the bead ring 32 is disposed quite precisely with respect to the pressure ring 29, the pressure ring 29 and the adjacent part of the bellows 30 is pushed airproof against the above-indicated system 33 of layers at the bead ring 32 as shown in FIG. 3 when the pressure segments 26 are in their expanded positions.

Figure 4A:
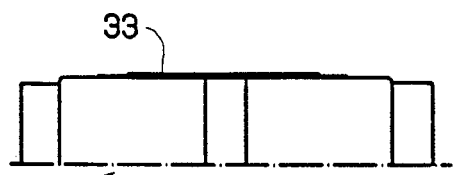
FIGS. 4A–4E schematically shows the succession of the operation of a tire-building drum with a randomly selected bead shoulder mechanism.
Figure 4B:
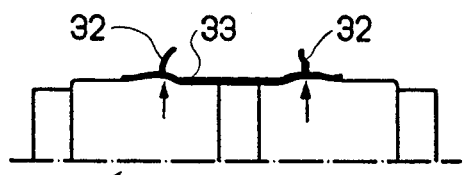
Figure 4C:
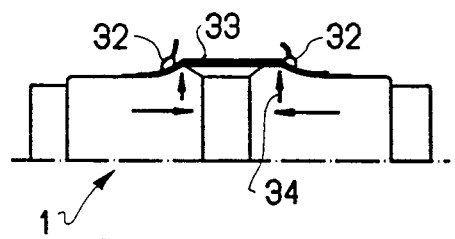

As shown in FIG. 4C the next step involves the formation of a shoulder 34 on the building drum 1 at the lateral inner side of each bead 32. In order to form these two shoulders, the building drum 1 comprises a mechanism that will be discussed further on in this description as the invention relates to this particular mechanism. At this point first a few subsequent steps in the operation of the building drum will be discussed, and such in so far as they are required for a proper understanding of the invented bead shoulder mechanism.

Figure 4D:
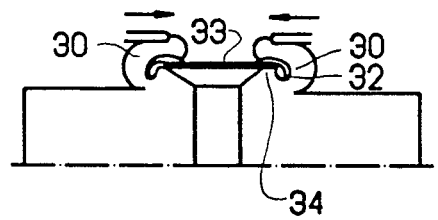

Following the formation of the two shoulders 34, the two bellows 30 are inflated, and subsequently these two bellows are folded until they point at one another, as shown in FIG. 4D. The right-hand bead 32 abuts against the right-hand shoulder 34 and the right-hand bellows 30 pushes against said right-hand bead. Also the parts of the layer system 33 disposed on the right-hand side of the bead 32 as shown in FIG. 4C are pushed by the inflated and folded bellows 30 until they extend over parts of the rest of the said layer system as shown in FIG. 4D.

Figure 4E:
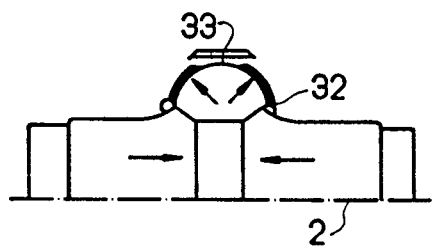

Subsequently the layer system 33 is inflated into a toroid as shown in FIG. 4E, the left-hand and right-hand drum portion 14 or 15, respectively, being moved towards one another to the extent desired for the formation of said toroid. This displacement is effected by rotation of the steering spindle 5 with respect to the shaft 3, on account of which the screw thread parts 6 and 7 on the steering spindle effect the displacement of the nuts 8 and 9, respectively. By means of these nuts 8 and 9, the drum portion 14 or 15, respectively, is displaced as in FIG. 1 via the pin 10 or 11, respectively.

Some known, further steps of processing will subsequently be carried out, but a description of these known, further steps is not required for a proper understanding of the invention.

After an example of a tire-building drum and the steps of its operation have been described above, the actual invention will be elucidated in the following.

On the one hand a flat building drum 1 as shown in FIGS. 1 and 4A, i.e. being substantially cylindrical in its starting position, is desired, as it allows the highly mechanized building of radial tires for passenger cars. The bead rings, having a greater diameter than the building drum 1 in its starting position, can easily be transported coaxially along the building drum to their correct positions. However, such a flat building drum should comprise means that are able to support the bead with high apex and flipper against deformation, said beads with high apex and flipper being a desired feature in radial tires designed for fast cars. The quality of a tire is to a great extent determined by the position and the shape of the bead, which position and shape can be positively influenced by means that retain and support the bead in its accurate position and shape during the construction of the tire. As a bead wire bundle can e.g. be approx. 7 mm in cross-section and the difference between the internal diameter of a bead wire bundle and the external diameter of a flat building drum in its passive position amounts approx. to 25 mm, it is desired to have a shoulder support the bead, the height of this shoulder e.g. amounting to four times the cross-section of the bead wire bundle so as not only to support the bead wire bundle, but also the pertaining apex and flipper.

For this purpose, the invention as shown in FIGS. 2 and 3 comprises a number of rocker arms 35 disposed annularly about the shaft 3 (FIG. 1), which number may e.g. amount to forty-eight. These rocker arms are pivotally supported, e.g. by means of a ball joint 48, by a sleeve 36 which extends in a ring shape about and is slidable over the carrier 17. A part 37 of the sleeve 36 cooperates as a piston together with a ring 38 secured on the carrier 17. Means which are easy to develop for an expert and which will therefore not be discussed here, are employed to supply compressed air to the space 43 between the sleeve part 37 and the ring 38, causing the sleeve 36 to shift from the position as shown in FIG. 2 to the position as shown in FIG. 3.

On the closing ring 25, as shown in FIGS. 2 and 3, a holder 39 extending annularly about the shaft 3 is mounted. This holder comprises a number of holes 40 of which the radial sections as shown in FIGS. 2 and 3 only show one example. Into each hole 40 one end of a spring 41 protrudes, and the other end of said spring protrudes into a hole 42 in the sleeve 36. These springs 41 serve to push the sleeve 36 back from the position as shown in FIG. 3 to the position as shown in FIG. 2, after the pressure created by the compressed air in the space 43 between the sleeve 36 and the ring 38 has been lifted.

As shown in FIGS. 2 and 3, one end of the folding bellows 30, essentially U-shaped in radial section, is connected to the rocker arms 35, whereas the other end of the said bellows is connected to the cylinder holder 19.

On account of the step of shifting the sleeve 36 from the position as shown in FIG. 2 to the position as shown in FIG. 3 by over-pressure as described in the foregoing, the rocker arms 35 are pushed to the right and they swivel upwards in this process as they run up against the conical top 44 of the holder 39. When the over-pressure in the space 43 is lifted, the springs 41 push the sleeve 36 and the rocker arms coupled thereto to the left from the position as shown in FIG. 3 to the position as shown in FIG. 2, the resilience of the bellows 30 forcing the rocker arms 35 to swing back to their retracted positions as shown in FIG. 2.

As appears from FIG. 3, the invented rocker arms 35 in their upward positions push the bellows 30 upwards to a considerable height with respect to the bead wire bundle 32. In this way the aim of the invention is achieved, i.e. that the bead ring 32 with apex 46 and flipper 47 is supported, even when this apex and flipper are high with respect to the bead wire bundle 32. Furthermore it appears from FIG. 2 that the rocker arms 35 in their retracted positions do not protrude beyond the rest of the building drum 1. Thus the desired starting point of the invention is achieved, being that the bead rings and other materials of which the tire will be composed, can be disposed coaxially to the building drum 1 easily and fast, and preferably automatically.

The resilient deformability of the bellows 30 made of natural or silicon rubber allows the bead 32 with apex 46 and flipper 47 to be supported firmly and airproof by means of the layer system 33 of the tire under construction and the part of the bellows 30 carried by the rocker arms 35 as shown in FIG. 3. This results in that the still unvulcanized tire is of higher quality than a tire of this type in which the bead is merely supported laterally near the bead wire bundle 32, i.e. in a direction parallel to the centre line of the building drum.

Preferably the steering spindle 5 can be operated independently of the piston 21 and the sleeve 36. On account of this, the steering spindle allows the two drum portions 14 and 15 to be shifted further towards one another after the building of the tire under construction is finished. This results in that the bellows 30 is torn away from the tire, as it will stick to some extent to the tire of unvulcanized rubber.

Furthermore the pressure ring 29 as shown in FIG. 2 is preferably provided with an appendix 45 extending annularly about the shaft 3 (FIG. 1) and being retained with its radial inner end between the closing ring 25 and the holder 39. This appendix serves to increase the force with which the pressure ring 29 as shown in FIG. 3 biasses the segments 26 radially inwards.

I claim:

1. A tire building drum including a central drum portion (16) and right-hand and left-hand end drum portions (14, 15) with each end drum portion including a mechanism for supporting and retaining the beads (32, 46, 47) when building at least a portion of a pneumatic tire on the building drum (1), said mechanism comprising means (29) for radially supporting at least part of said bead; radially expandable and retractable means (35) for laterally supporting at least a part of the head in the direction facing away from said central drum portion (16) and parallel to the center line of the building drum, said expandable and retractable means (35) including a large number of rocker arms (35) having first ends and arranged in a ring shape about the center line of the building drum (1); means (36–44) to shift and swivel all of these rocker arms simultaneously to an expanded position of said first ends and to retract them again, said swivelling action of each rocker arm being performed in an imaginary plane extending radially through the center line (2) of the drum (1) and said shifting action including a component directed along the center line of the building drum; and a bellows (30) secured with one edge in the first ends of all said rocker arms (35), said bellows (30) being U-shaped in radial section, and serving to fold back any layers (33) of tire material protruding beyond the bead (32) in the direction of one end of the building drum (1).

2. A tire building drum according to claim 1, characterized in that said building drum includes a shaft (3), a conical expanding surface (44) extending around the shaft (3) and along which the rocker arms (35) are shifted so that they swivel and thereby assume their expanded positions.

3. A tire building drum according to claim 1, characterized in that the rocker arms (35) are mounted for expansion to such an extent that the bead (32) with its apex (46) and flipper (47) abuts against the expanded rocker arms via the rest of the parts (33) present there of the tire under construction.

4. A tire building drum according to claim 1, characterized by a piston (36), displaceable parallel to the center line of the drum (1) and towards said means (29) for radially supporting at least a part of said bead, said piston being coupled to all rocker arms (35) in order to shift the rocker arms into their expanded positions by means of over-pressure on the piston.

5. A tire building drum according to claim 4, characterized in that each rocker arm (35) is coupled to the piston (36) by means of a ball joint (48).

6. A tire building drum according to any preceding claim, characterized in that the drum is a flat building drum (1) having the two end portions (14, 15) which are mirror symmetric with respect to a plane perpendicular to the center line of the building drum and having means for shifting said end portions (14, 15) towards and away from one another, the diameter of the building drum being smaller in its flat condition than the internal diameter of a bead (32), and in which the building drum regains its original diameter when the rocker arms (35) are retracted.

7. A tire building drum according to claim 6, characterized in that the means for shifting the end portions (14, 15) of the building drum towards and away from one another is independently operable from the means for expanding and retracting the rocker arms (35).

8. A tire building drum (1) having a center line (2) and including a central drum portion (16) and right-hand and left-hand drum portions (14) (15), each of said right-hand and left-hand portions comprising a mechanism for supporting and retaining beads (32, 46, 47) when building at least a portion of a pneumatic tire on said building drum (1); each of said mechanisms comprising a large number of rocker means (35) having first ends located on the side thereof opposite said central drum portion (16) and disposed in a ring shape about the center line (2) of the building drum (1); means (36–44) to shift and swivel all of said rocker means (35) simultaneously to a radially expanded position of said first ends and to retract them again, said swivelling action of each of said rocker means (35) being performed in an imaginary plane extending radially through the center line (2) of the drum (1) and said shifting action including a component directed along the center line (2) of the drum (1); pressure segments (26) having radial outer ends and mounted on said drum for radially slidable back and forth movement with respect to the center line (2) of the building drum (1), said pressure segments (26) including recesses in their radial outer ends; a pressure ring (29) of resilient material disposed in said recesses; and a bellows (30) secured with one edge in the first ends of all said rocker means (35), said bellows being U-shaped in radial section and extending across said pressure ring (29) and serving to fold back any layers of tire material protruding beyond the bead (32, 46, 47) in the direction of one end of the building drum (1); said rocker means (35) and said bellows (30) forming a drum shoulder (34) on the side of said rocker means (35) opposite the central drum portion (16) in the radially expanded position of the rocker means (35), said drum shoulder serving for laterally supporting each bead (32, 46, 47) and the part of the bellows extending across the pressure ring (29) and the pressure ring (29) serving for radially supporting each bead (32, 46, 47).

* * * * *